(12) United States Patent
White et al.

(10) Patent No.: US 9,840,376 B2
(45) Date of Patent: Dec. 12, 2017

(54) SINGULATION APPARATUS AND METHOD

(71) Applicant: Compac Technologies Limited, Auckland (NZ)

(72) Inventors: Sheldon Phillip White, Auckland (NZ); Jonathan Patrick Jackson, Auckland (NZ); Max Hilton Hendrikse, Auckland (NZ); Eric Adrianus Plessius, Auckland (NZ)

(73) Assignee: Compac Technologies Limited, Auckland (NZ)

( * ) Notice: Subject to any disclaimer, the term of this patent is extended or adjusted under 35 U.S.C. 154(b) by 0 days.

(21) Appl. No.: 14/508,917

(22) Filed: Oct. 7, 2014

(65) Prior Publication Data

US 2016/0052729 A1 Feb. 25, 2016

Related U.S. Application Data

(63) Continuation of application No. PCT/NZ2014/000170, filed on Aug. 19, 2014.

(51) Int. Cl.
| | |
|---|---|
| *B65G 51/01* | (2006.01) |
| *B65G 47/14* | (2006.01) |
| *B65G 47/70* | (2006.01) |
| *A23N 15/06* | (2006.01) |
| *B07C 5/02* | (2006.01) |
| *B65G 47/71* | (2006.01) |
| *A23N 15/00* | (2006.01) |

(52) U.S. Cl.
CPC ............. *B65G 51/01* (2013.01); *A23N 15/06* (2013.01); *B07C 5/02* (2013.01); *B65G 47/1492* (2013.01); *B65G 47/70* (2013.01); *A23N 2015/006* (2013.01); *B65G 47/71* (2013.01); *B65G 2201/0211* (2013.01)

(58) Field of Classification Search
CPC ........ B65G 51/01; B65G 11/20; B65G 11/203
USPC .... 405/119, 120, 121, 122, 123; 406/79, 82, 406/192
See application file for complete search history.

(56) References Cited

U.S. PATENT DOCUMENTS

| | | | | |
|---|---|---|---|---|
| 2,608,716 | A * | 9/1952 | Harris | 452/14 |
| 2,799,540 | A * | 7/1957 | Makinson | 406/94 |
| 2,824,665 | A * | 2/1958 | Lamouria | 221/179 |
| 3,499,687 | A * | 3/1970 | Ellis | 406/82 |
| 3,567,017 | A * | 3/1971 | Hughes et al. | 209/156 |
| 3,610,395 | A * | 10/1971 | Amori | 198/445 |
| 3,643,400 | A * | 2/1972 | Barbet | 53/248 |

(Continued)

FOREIGN PATENT DOCUMENTS

WO     2012104215     8/2012

*Primary Examiner* — Joseph Dillon, Jr.
(74) *Attorney, Agent, or Firm* — Lowe Graham Jones PLLC

(57) ABSTRACT

The present disclosure relates to apparatus for carrying articles such as fruit for sorting, and in particular though not exclusively to apparatus for singulating the articles. There is provided a singulation apparatus for an article carrying system, the apparatus comprising a flume adapted to receive a plurality of articles at a first end; a fluid inlet associated with the first end and arranged in use to direct a fluid flow to carry the received articles along the flume to a second end; wherein a parameter of the fluid flow is controlled in order to singulate the received articles along the flume. A method for singulation is also disclosed.

9 Claims, 7 Drawing Sheets

(56) References Cited

U.S. PATENT DOCUMENTS

| | | | | |
|---|---|---|---|---|
| 3,656,272 | A * | 4/1972 | Sheetz | 53/473 |
| 3,701,565 | A * | 10/1972 | Gutterman et al. | 406/46 |
| 3,704,041 | A * | 11/1972 | Loveland et al. | 406/32 |
| 3,822,015 | A * | 7/1974 | Hsieh et al. | 209/173 |
| 3,892,563 | A * | 7/1975 | La Point | 241/20 |
| 3,918,116 | A * | 11/1975 | Valdespino | 15/3.13 |
| 3,975,275 | A * | 8/1976 | Kato | 210/160 |
| 4,055,488 | A * | 10/1977 | Siri | B03B 5/40 198/722 |
| 4,149,710 | A * | 4/1979 | Rouchard | A63G 21/18 104/70 |
| 4,194,922 | A * | 3/1980 | Gransell et al. | 134/1 |
| 4,198,043 | A * | 4/1980 | Timbes | A63G 21/18 104/70 |
| 4,198,902 | A * | 4/1980 | Worden | A01J 25/167 134/125 |
| 4,211,609 | A * | 7/1980 | Diggs | 202/176 |
| 4,267,980 | A * | 5/1981 | LaPoint | 241/20 |
| 4,320,995 | A * | 3/1982 | Tennes et al. | 406/39 |
| 4,567,906 | A * | 2/1986 | Brule' | B65G 49/0418 134/127 |
| 4,759,841 | A * | 7/1988 | Flodin | 209/155 |
| 4,807,422 | A * | 2/1989 | Blanc | 53/248 |
| 4,898,270 | A * | 2/1990 | Hopkins et al. | 198/396 |
| 4,901,861 | A * | 2/1990 | Cicchelli | 209/539 |
| 4,932,513 | A * | 6/1990 | Michimae et al. | 198/397.06 |
| 5,083,417 | A * | 1/1992 | Jeronimidis | A01D 44/00 198/512 |
| 5,242,250 | A * | 9/1993 | Compagnoni | B65B 25/045 141/70 |
| 5,248,045 | A * | 9/1993 | Alvelda | 209/522 |
| 5,259,302 | A * | 11/1993 | Chen | 99/405 |
| 5,413,131 | A * | 5/1995 | Medlock | 134/104.4 |
| 5,645,092 | A * | 7/1997 | Beaumont | 134/102.2 |
| 5,704,733 | A * | 1/1998 | de Greef | 406/79 |
| 5,743,694 | A * | 4/1998 | Hines | 414/137.7 |
| 5,868,256 | A * | 2/1999 | Teppo | 209/173 |
| 6,527,124 | B1 * | 3/2003 | Nakhei-Nejad | 209/173 |
| 6,655,878 | B1 * | 12/2003 | de Vos et al. | 406/77 |
| 6,832,681 | B2 * | 12/2004 | VanBerlo | 198/536 |
| 6,837,362 | B2 * | 1/2005 | van Wijngaarden et al. | 198/443 |
| 6,840,715 | B2 * | 1/2005 | Crovara Pescia | 406/92 |
| 7,361,282 | B2 * | 4/2008 | Smullin | 210/703 |
| 7,674,077 | B2 * | 3/2010 | Opatril | 406/106 |
| 8,109,698 | B2 * | 2/2012 | De Greef | 406/106 |
| 8,147,298 | B2 * | 4/2012 | Nolsoe | 452/106 |
| 8,821,078 | B2 * | 9/2014 | Hockett et al. | 406/181 |
| 2003/0178285 | A1 | 9/2003 | Van Wijngaarden | B65G 51/01 198/443 |
| 2005/0205391 | A1 * | 9/2005 | De Greef | 198/383 |
| 2005/0210831 | A1 * | 9/2005 | Blanc | 53/248 |
| 2014/0166551 | A1 * | 6/2014 | Blanc | B03B 5/00 209/606 |

\* cited by examiner

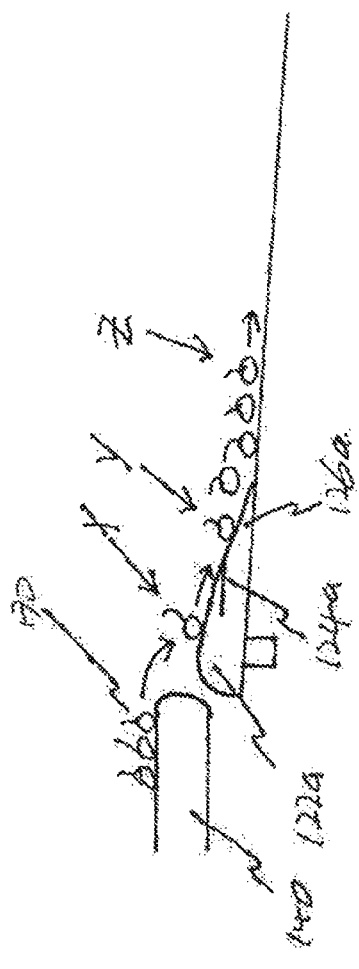
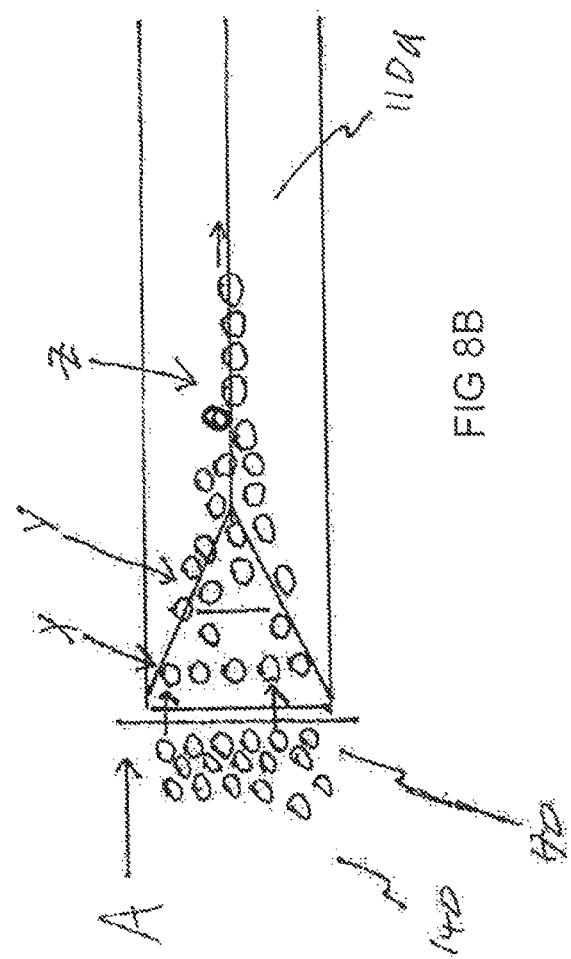

SINGULATION APPARATUS AND METHOD

PRIORITY CLAIM

This application is a continuation of PCT Application Serial No. PCT/NZ2014/000170 filed Aug. 19, 2014.

FIELD OF THE INVENTION

The present disclosure relates to apparatus for singulating articles such as fruit for sorting.

BACKGROUND OF THE INVENTION

Processing lines for articles such as fruit often require different articles to be separated. This is an important commercial function, which may be used for example, to distinguish fruit destined for export and fruit destined for the local market. Manual grading of articles is costly, slow and prone to inaccuracies. Thus, automated methods and apparatus for grading articles have been developed. Known sorters can grade and sort produce by weight, color, blemish, dimensions, shape, density, internal quality, etc.

Article carriers are used to transport articles such as fruit through various stages for grading purposes, and to eject fruit at a required location dependent on the result of the grading process. The use of one or more video cameras is one known method of automatically sensing characteristics of articles. The article carriers typically include an endless circuit of cups on a conveyor chain with the cup situated to unload fruit at one of a plurality of stations. Each cup is usually arranged to carry a single article in order to enable sensing of the individual articles. In order to deliver a single article to each cup or carrier partition, a singulation process is required which receives randomly located articles across a relatively large area, and effectively funnels these into a single line of articles. A tapering chute and/or v-belt may be used for this function. However such arrangements can result in impacts and chaffing which damage delicate articles such as fruit. Such impacts and chaffing may occur between an article and surfaces of the singulation apparatus as well as with other articles. These problems are magnified when efficient high speed apparatus are utilized.

Throughout this specification, any reference to items of prior art is in no way to be deemed as an admission that such prior art constitutes part of the common general knowledge.

SUMMARY OF THE INVENTION

The present invention is directed to providing an improved article carrier apparatus, or at least to provide the public with a useful alternative.

In one aspect there is provided a singulation apparatus for an article carrying system. The apparatus comprises a flume adapted to receive a plurality of articles at a first end, and a fluid inlet associated with the first end and arranged in use to direct a fluid flow to carry the received articles along the flume to a second end. A parameter of the fluid flow is controlled in order to singulate the received articles along the flume. By singulating using a flow of fluid such as water, handling of delicate articles such as cherries can be improved by lessening the impact between other cherries and against walls of the apparatus. Similarly chaffing and scraping of the cherry surface is also reduced. One or a number of parameters of the fluid flow may be controlled in order to improve singulation effectiveness, for example: fluid volume flow rate; fluid speed; fluid level in the flume.

In an alternative embodiment the apparatus further comprises a pliable landing surface at the first end for receiving the articles prior to carriage along the flume. The pliable landing surface reduces the impact on landing cherries or other delicate articles therefore minimizing damage. The landing surface may comprise a pliable material such as TPU and arranged in use is to be inflated by the fluid flow. The landing surface may also comprise a lower padded surface separated from the pliable material by an orifice, the pliable material being located adjacent the fluid inlet such that in use the pliable material is inflated by the fluid flow which is then directed into the flume via the orifice.

In a different embodiment, the apparatus further comprises a load belt for receiving articles from the second end of the flume. In use the fluid speed may be controlled to be substantially equal to the speed of the load belt. Alternatively the fluid speed may be higher in order to encourage bunching of the articles at the second end of the flume, especially when there are a lower number of articles being received.

In yet an alternative embodiment the apparatus includes a plurality of flumes, these typically being arranged substantially in parallel and having associated water inlets.

In a second aspect there is provided an article carrier system for sorting articles such as fruit, and which comprises a singulation apparatus as defined above. The system may also include a carrier for carrying singulated articles through an inspection site for automatically sensing characteristics of the articles. The articles may then be sorted into different further processing channels, dependent on the sensed characteristics. The carrier may comprise an endless circuit of cups.

In a third aspect there is provided a method of operating a singulation apparatus having a flume adapted to receive a plurality of articles at a first end. The method comprises directing a fluid flow to carry the received articles along the flume from the first end, and controlling a parameter of the fluid flow in order to singulate the received articles along the flume.

In one embodiment the method may also comprise inflating a pliable landing surface with the fluid at the first end of the flume.

In an alternative embodiment the method may also comprise controlling a load speed belt located at a second end of the flume dependent on the parameter of the fluid.

The invention may also be said broadly to consist in the parts, elements and features referred to or integrated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

Embodiments are described with reference to the accompanying drawings, by way of example and without intending to be limiting, in which:

FIG. 8A is a schematic illustrating singulation of cherries in a side view of a singulation channel of the apparatus of FIG. 2;

FIG. 8B is a schematic illustrating singulation of cherries in a plan view of a singulation channel of the apparatus of FIG. 2.

DETAILED DESCRIPTION OF THE PREFERRED EMBODIMENT

Figure 1:
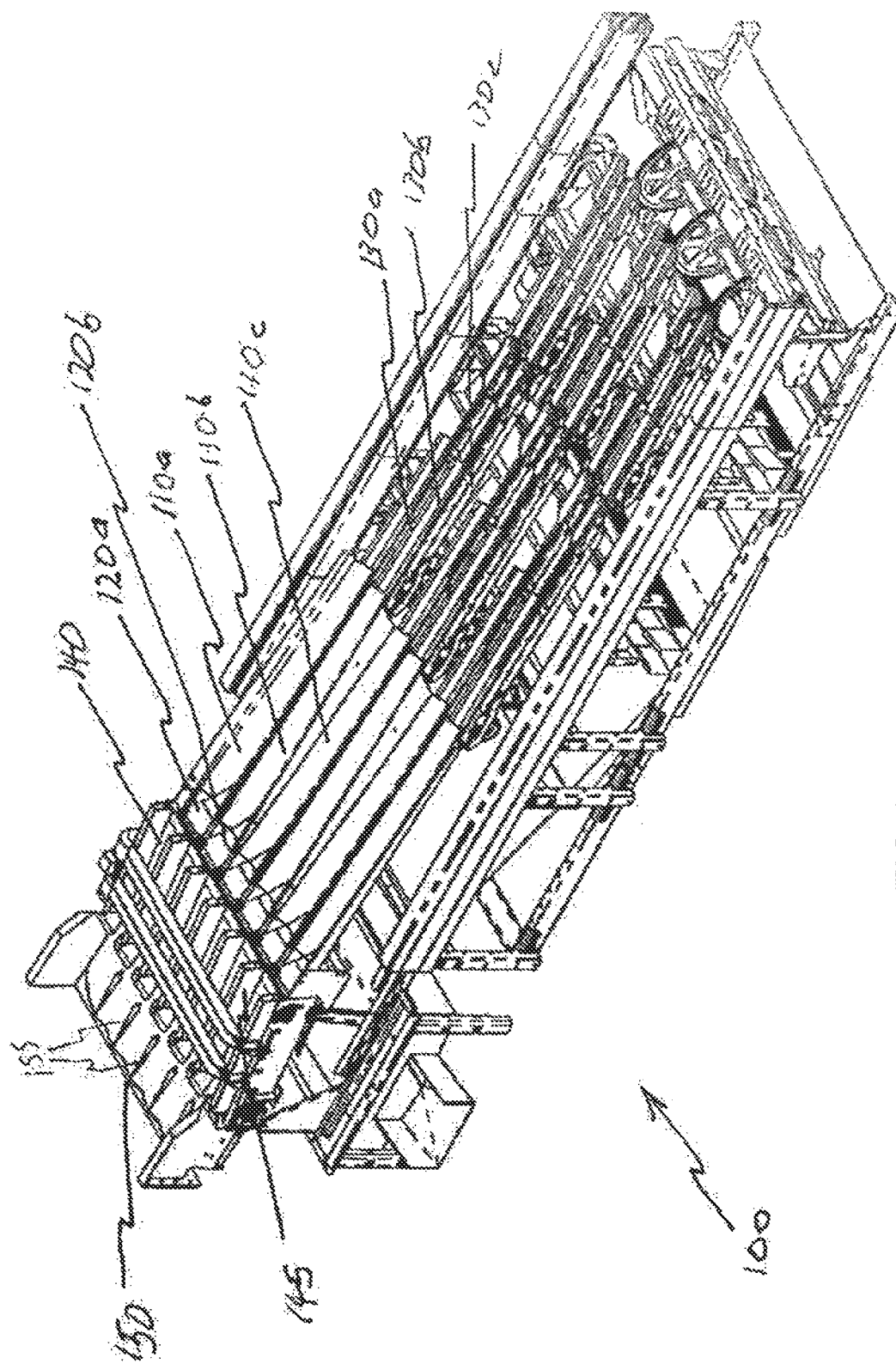
FIG. 1 shows a perspective view of a carrier apparatus according to an embodiment.

FIG. 1 is a perspective view of part of an article carrying system suitable for transporting cherries and other delicate articles as part of a larger sorting system. The system includes a singulation apparatus 100 which comprises a number of singulation flumes 110a-c which are arranged to deliver single cherries to respective load belts 130a-c, thus forming part of a plurality of channels for carrying and sorting cherries or other fruit. At a first end, each flume has a pliable landing surface 120a-c for receiving cherries prior to singulation along the flume, and delivery at a second end of the flume to the load belts.

An in-feed belt 140 delivers cherries to the flumes 110a-c in a random manner and across a width of several cherries. The in-feed belt has associated dividers 145 which form the start of a plurality of carrying channels, each in-feed belt section formed by two dividers delivering cherries to a respective singulation flume. An in-feed tray 150 receives cherries and using a series of diverters 155 evenly distributes the flow of cherries across the in-feed belt in order to optimize processing of the cherries across the plurality of channels.

The singulation apparatus forms part of a larger article carrying system which is typically used for grading and sorting articles such as fruit. Fruit such as cherries may be received in batches from harvesting, and are input to the system which then attempts to more uniformly handle individual cherries for grading, for example using a camera based inspection system. Once a quality level or grade is determined by the inspection, the cherries are carried to different channels depending on their grading, and separate further processing for example packaging and transport. In order to maximize system efficiency, a high through rate of cherry handling by the system is desirable. However such high speeds can negatively impact on the cherries, for example by impact damage. Also in order to optimize the efficiency of downstream handling, the singulation apparatus should preferably provide single cherries at a high and uniform rate to the downstream processes. The singulation apparatus 100 both improves singulation effectiveness in terms of providing single cherries at a high rate, and also minimizes damage to the cherries in the process of doing so.

Figures 2, 3:
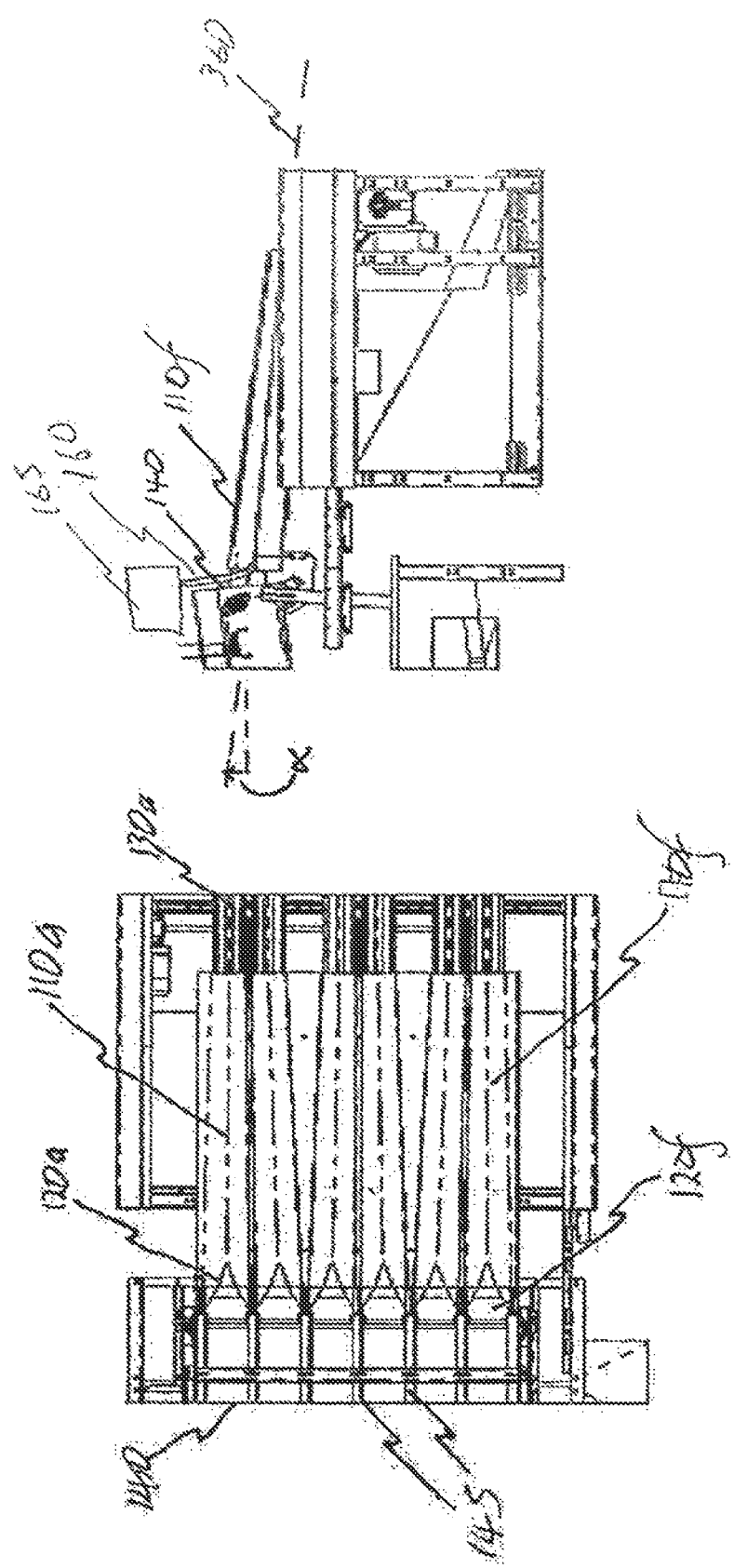
FIG. 2 shows a plan view of a singulation apparatus within the carrier apparatus of FIG. 1.
FIG. 3 shows a side view of the singulation apparatus of FIG. 2.

FIG. 2 is a plan view of the singulation apparatus of FIG. 1, and shows the plurality of flumes 110 having at a first end a respective pliable landing surface 120 which receives cherries from the in-feed belt 140. A second end of each flume is arranged adjacent a respective load belt 130 such that single cherries are delivered onto each load belt. In use water is arranged to flow from the first to the second end of each flume 110, and a parameter such as the volume rate (L/min) of the water flow is controlled in order to singulate the received cherries. The load-belts 130 are arranged to allow water to drain whilst the cherries are carried to the next stage of the sorting system—typically a sorting carrier having individual cups for carrying respective single cherries for imaging and sorting. The load-belts may comprise two belts arranged into a truncated V-section to allow water to drain between them.

The water flow parameter is controlled to effectively singulate the cherries or other fruit. This parameter may be the water volume flow rate (L/min), water speed (m/s), or water level (mm) in the flume. These parameters may be controlled separately or by adjusting the volume flow rate which in turn will affect the speed and/or level. In practice the water level in the flumes is sufficiently high to enable the cherries to float freely within the flumes, but not so high to provide a water width sufficient to allow two cherries to float side-by-side. Preferably the water depth and width are such that the cherries float but are urged and maintained at the center of the flume. The water flow speed is preferably also controlled to substantially match the load belt speed in order to minimize the risk of singulated cherries jumping at a substantial change in speed when being delivered onto the load belt. Such jumping may cause the cherries to spill off the load belt thereby reducing overall efficiency of the apparatus.

In other embodiments, the water speed is controlled to be faster than the load belt speed causing the cherries to bunch up as they are transferred to the load belt. This reduces gaps between cherries on the load belt, thereby increasing efficiency of the apparatus sorting the fruit downstream. The water speed may be controlled to adjust between these options depending on the amount of cherries in the flumes, for example a high concentration of cherries preferring the matching load belt speed and a low concentration of cherries preferring a faster water speed to help bunch the lower number of cherries together. This variation in water speed and/or load belt speed may be controlled manually by an operator or automatically usual a local camera to determine cherry numbers or feedback from a downstream cherry monitoring/grading process which determines gaps in the cherries presenting for checking.

FIG. 3 is a side view of the singulation apparatus of FIG. 2, and shows the flumes 110 angled downwardly from their first to second ends. This allows the water to flow and clear more effectively along the flumes and enhances the singulation process. A shallower angle ∞ equates to a deeper water level to flow correctly which reduces the singulation effectiveness as the cherries are then too buoyant and do not stay in the middle and in single file. A higher angle ∞ causes shallower water such that the cherries do not float giving inconsistent flow and a higher possibility of stalling and blockages. In practice an angle ∞ to the horizontal of 2-3 degrees has been found effective.

A water inlet 160 is provided to the first end of each flume 110. The water may be supplied by a low head reservoir 165 which provides a low and constant water pressure and hence low turbulence water flow in each flume to assist with the singulation process. As noted above water emptying from the flumes onto the load belts is drained along the load belts. The water inlets 160 run from the water reservoir 165 to respective nozzles at the first end of each flume. Typically they will include respective valves to control the water flow in the flumes.

It has been found in practice that the use of water flow in flumes as a singulation process results in less damage to the singulated fruit as impacts with walls of the singulation apparatus are dampened or eliminated altogether. Similarly impacts with other fruit are also reduced or dampened. Because of the use of water floatation, rubbing or chaffing of the fruit is also reduced, resulting in less damage.

Figure 4:
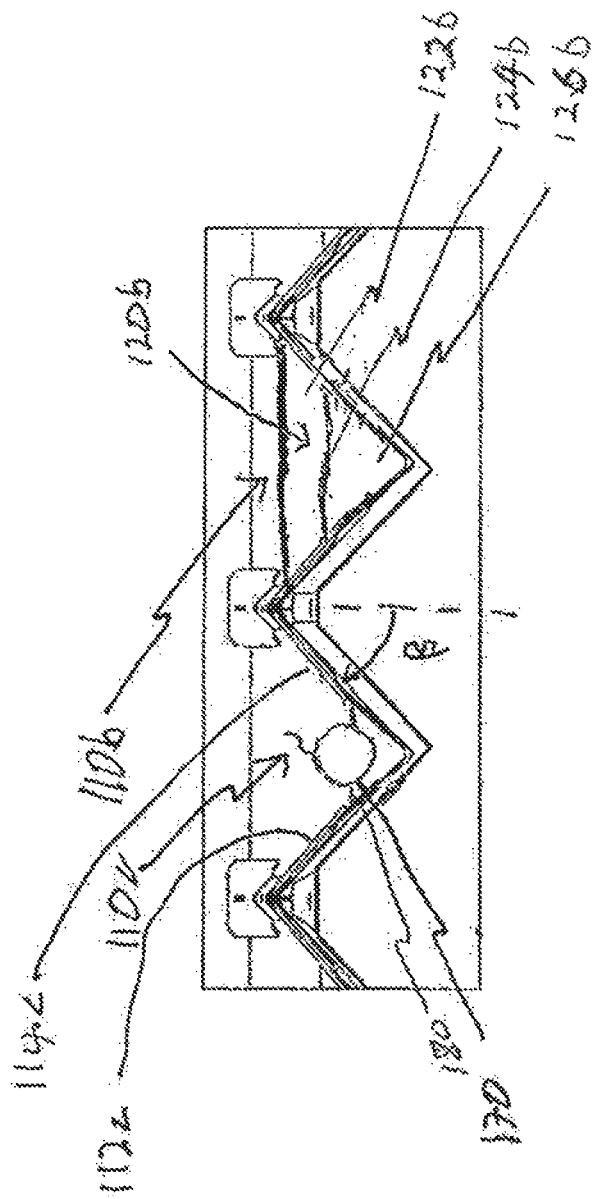
FIG. 4 shows a section of the channels of the singulation apparatus of FIG. 2.

FIG. 4 shows a cross section of two singulation flumes 110c and 110b. The flumes have a V-shape cross section in this embodiment, although alternative shapes are possible including U and truncated V for example. Each singulation flume 110c has side walls 112c and 114c. In this embodiment these walls are arranged at an angle of between 90 to 120 degrees to the vertical which provides efficient singulation and prevents jamming. A single cherry 170 is illustrated floating in the water flow 180. As can be seen the water flow 180 is sufficient to allow the cherry 170 to fully float, but is insufficient to allow a second cherry to float alongside such that other cherries must fall behind or in front of the cherry 170 effectively singulating a plurality of such cherries.

In an embodiment the water flow may be controlled such that the average water depth in the flume is the height of an article, especially for non-floating articles, or sufficient to allow an article to float without its bottom surface chaffing the bottom of the flume. Meanwhile the average width of the water flow is controlled to be less than two article widths in order to ensure singulation.

Having the walls sufficiently high compared with average water heights allows the water to build up behind a blockage until the pressure flushes the blockage away. Whilst in this embodiment the flumes are a fixed shape, in other embodiments these may taper towards the second end in order to enhance the singulation process.

As noted above each flume 110b also comprises a pliable landing surface 120b at its first end. In this embodiment the pliable landing surface comprises a pliable material which is inflated by the water flow into the flume. This water inflated landing surface 122b acts as a soft cushion onto which the cherries land when received from the in-feed belt, thereby reducing their landing impact and hence potential damage. The pliable material may be a thermoplastic polyurethane (TPU) sheet arranged over the water inlet however any suitable pliable material may alternatively be used. In the embodiment shown, the pliable material is separated from a lower padded surface 126b by a slit 124b which allows the water flow into the flume 110b. Other arrangements are possible, for example using different orifices at different locations about the landing surface 120b, or utilizing an inflated pliable material without a separate padded and non-inflated surface.

The water inflated landing surface 122b is located to receive the cherries landing from the in-feed belt, and which roll or slid down its surface towards the slit 124b. Water flow from the slit then carries the cherries down the padded surface 126b into the flume and away from other cherries landing on the upper region. This hydro-cushion arrangement effectively cushions the impact of the cherries landing, and efficiently clears them from the landing zone so that they are not impacted by subsequently landing cherries. The dampening effect of the inflated pliable landing surface also prevents the cherries from bouncing, further reducing potential damage and enhancing effective clearing of cherries into the flume. In the embodiment the pliable surface is angled less than 45 degrees from the longitudinal axis of the flume in order to optimize this process. However other angle ranges could alternatively be used. Similarly, different hydro-cushion arrangements could be used, for example employing a non-slit orifice or a single region with water flow appearing from the bottom of the pliable material.

Figure 6:
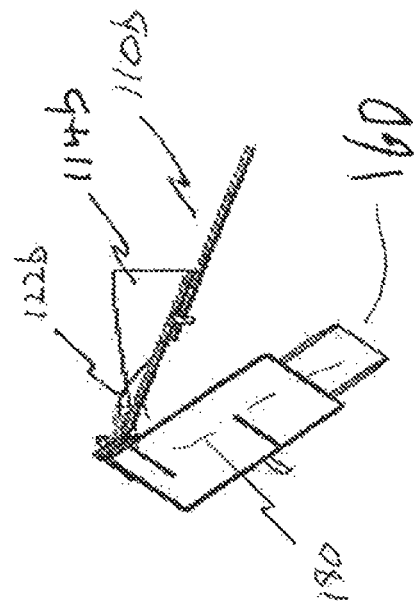
FIG. 6 is a detail showing a side view of the hydro-cushion of FIG. 5.
Figure 5:
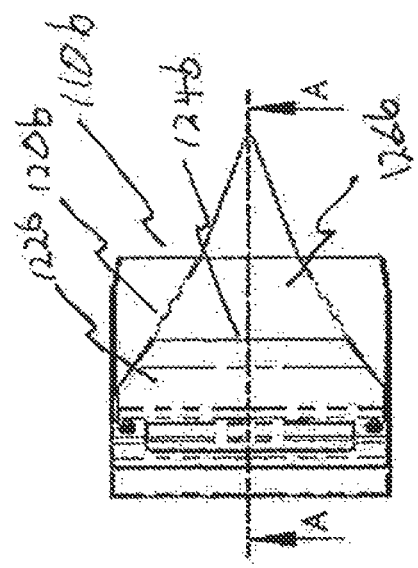
FIG. 5 is a detail showing a plan view of a hydro-cushion from one of the channels of FIG. 4.

FIG. 5 is a detailed plan view of the hydro-cushion arrangement 120b showing the inflated pliable material landing surface 122b, the water flow outlet slit 124b and the lower padded surface 126b. The pliable material 122b will taper into the flume 110b as shown as the flume's cross-sectional width narrows. FIG. 6 is a detailed side and cut-away view of the same hydro cushion arrangement 120b showing the pliable material 122b bulging or inflated with the incoming water flow, and the hydro-cushion 120a tapering towards the bottom of the flume down the side walls 114b. The water flow is provided via water inlet 160 which typically terminates in a nozzle which directs the water flow under the pliable material at its upper region. However alternative water flow arrangements could be used.

Figure 7A:
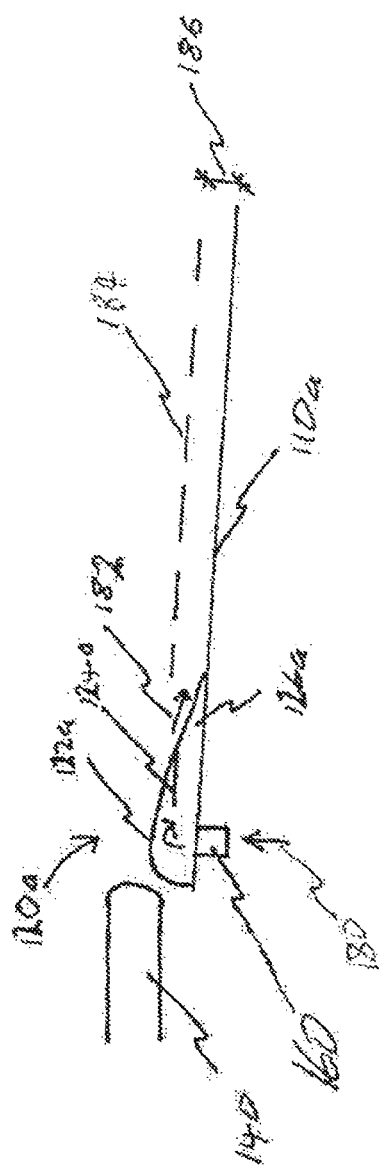
FIG. 7A is a schematic illustrating water flow in a side view of a singulation channel of the apparatus of FIG. 2.
Figure 7B:
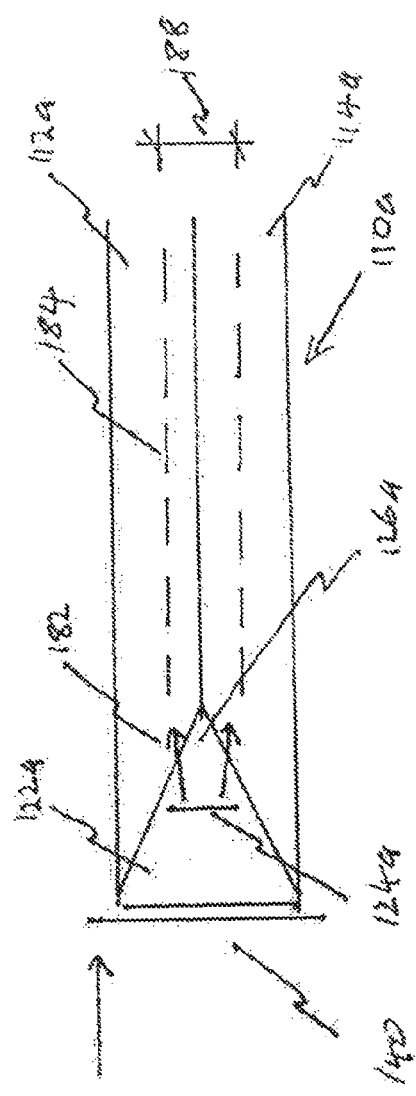
FIG. 7B is a schematic illustrating water flow in a plan view of a singulation channel of the apparatus of FIG. 2.

FIGS. 7A and 7B illustrate operation of the singluation apparatus in terms of the water flow. Water flows in at the water inlet 160 located adjacent the first end of the flume 110a. This incoming water flow 180 is directed into under the upper pliable material region 122a of the pliable landing surface 120a. This water flow inflates the pliable material 122a, flows out of the slit 124a and then flows down the outer surface of the padded surface 126a as indicated by flow 182. The water flow 184 in the flume is controlled to maintain a height 186 sufficient to allow articles such as cherries to move down the flume 110a. The water flow is also controlled to limit its width 188 in the flume to ensure singulation occurs. The water flow and levels shown are indicative and average only as especially about the landing surface 120a and initial part of the flume the water flow is likely to runs up the sides of the flume walls and may swirl before settling to these indicative flows and levels. The figure also shows part of the in-feed belt 140 from which the cherries fall onto the water inflated pliable material region 122a of the pliable landing surface 120a.

Typically the water flow matches the load belt speed. A faster water flow is possible which spaces out the cherries more and enhances singulation. This also results in packing together of the cherries as they transfer to the slower load belt. This increases cupfill but can also result in spilling of the cherries. A slower waterflow packs the fruit closer together impeding singulation.

FIGS. 8A and 8B illustrate operation of the singulation apparatus in terms of the passage of cherries. The cherries 170 are delivered by the in-feed belt 140 across the full width of each flume 110a (region X), and are delivered longitudinally at a non-uniform rate—there may be gaps or bunching of the cherries. The cherries are carried in direction A and at the end of the in-feed belt 140, they fall onto the inflated upper pliable material region 122a of a respective flume 110a. This inflated upper region 122a cushions their landing impact and they roll or slide down the rest of the downward sloping pliable landing surface 120a and are carried into the lower part of the flume by the water flow from the slit 124a. Due to the narrowing or taping of the flume and landing surface, as the cherries travel down this they will tend to funnel into the water flow of the flume and together this funneling and water flow will tend to singulate the cherries (region Y). By the time the cherries arrive at the second end of the flume they should be fully singulated (region Z) by the settled narrow water flow in order to be delivered singularly to the load belts.

Figure 9:
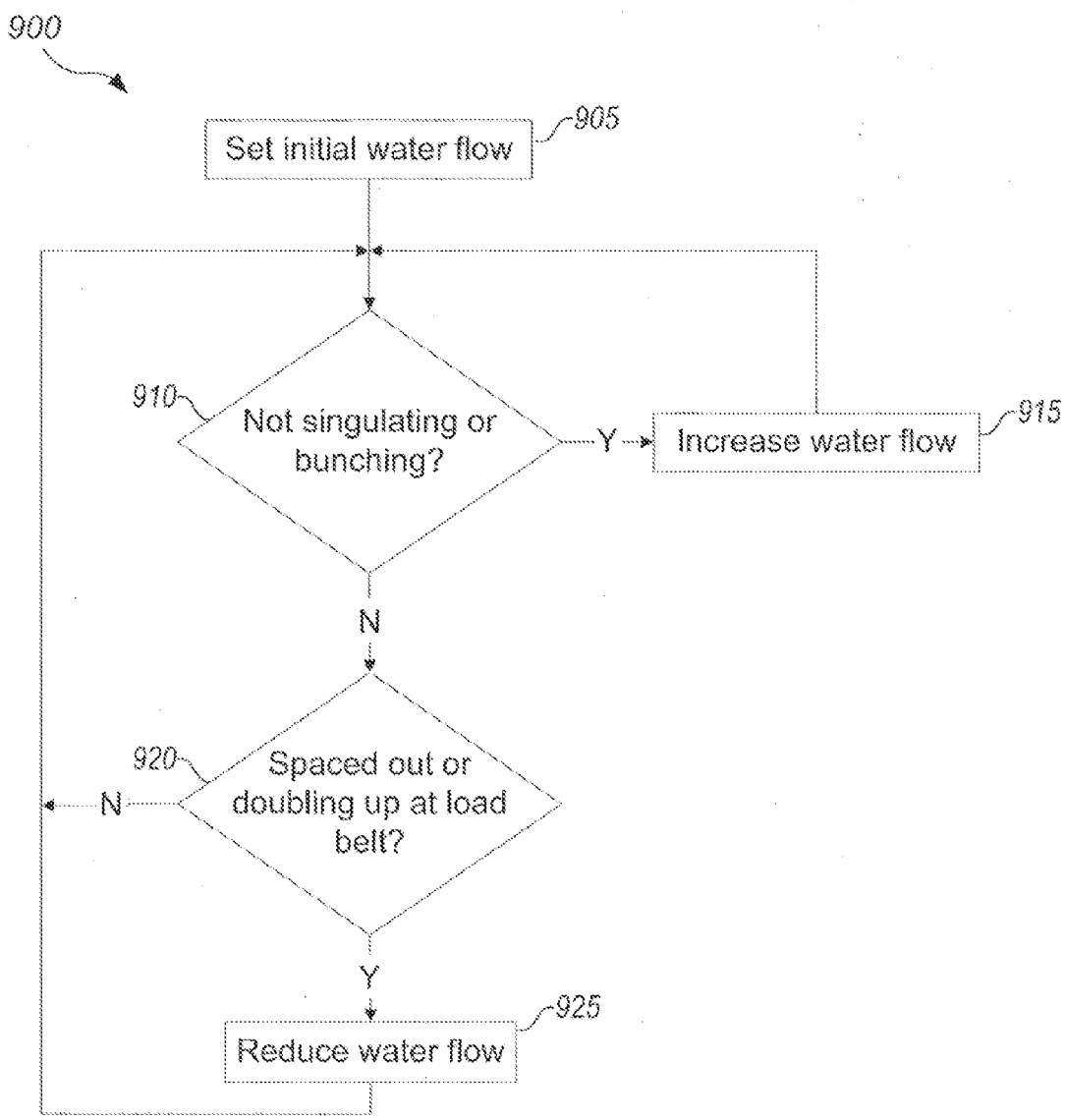
FIG. 9 is a flow chart illustrating operation of an exemplary control method for the singulation apparatus of FIG. 2.

FIG. 9 is a flow diagram illustrating flow control of the water in order to efficiently singulate cherries or other fruit carried through the above described singulation and carrier apparatus. The method 900 may be performed by an operator observing the singulation apparatus and adjusting one or more parameters of the water flow (flow volume per unit time, depth of water in the flumes, speed of water, or other water flow parameter). Alternatively the method 900 may be performed automatically using a suitable controller for adjusting the water flow level in response to determined parameters such as flume water depth, rate of cherries passing an observation point, speed of load belt. The method 900 comprises as an initial step 905 setting an initial water flow parameter. This may be a flow speed or rate which matches the speed of the load belt. Alternatively a historically determined level may be set.

At step 910, the method determines whether the cherries or other fruit are singulating properly, for example by visual inspection of an operator or imagining equipment, or downstream sorting carrier cup-fill levels. Alternatively such a condition may be inferred using a flume water depth and/or width measurement for example. If a not-singulating condition is determined 910Y, then the water flow is increased at step 915. This may be performed in an iterative or step manner until correct singulation is achieved. If however no bunching condition is determined 910N, then the method determines whether the cherries are too spaced out at step 920. This may be achieved by manual visual inspection or automated sensing, for example low cup-fill rates at the downstream sorting carrier, or inferred from the water level in the flume being too high or wide.

If no gapping is determined 920N then the method returns to its initial monitoring step 910. If however gapping or spaced out cherries are determined 920Y, then the method reduces the water flow at step 925. Again this may be carried out in an iterative or stepwise fashion. The method 900 then returns to the initial monitoring step 910. Additions to this method may include adjusting the water flow rate in response to detected changes in the load speed belt.

Whilst specific arrangements and embodiments have been described, alternatives are also contemplated. For example a fluid other than water may be employed to singulate the cherries, such as a mixture including a disinfecting and preserving agent, or a non-water liquid. Similarly whilst simple linear flumes have been described, more complex flumes could alternatively be used, for example with tapering towards the second end, with bends, and arranged in non-parallel configurations. In other alternative arrangements the pliable landing surface may not be inflated with water but a padded material, with water being just retain let into the flume below or above this padded material for example.

Unless the context clearly requires otherwise, throughout the description and the claims, the words "comprise", "comprising", and like, are to be construed in an inclusive sense as opposed to an exclusive or exhaustive sense, that is to say, in the sense of "including, but not limited to." Where in the foregoing description reference has been made to specific components or integers of the invention having known equivalents, then such equivalents are herein incorporated as if individually set forth. Although this invention has been described by way of example and with reference to possible embodiments thereof, it is to be understood that modifications or improvements may be made thereto without departing from the scope of the invention.

Any methods here disclosed or claimed may be implemented using a computer program product which when implemented on a computer causes the computer to execute the methods. Such a computer and/or computer program product may be implemented by any suitable processor and computer program, for example a general purpose processor and computer code instructions on a memory device CD ROM or the like or a downloaded file, a digital signal processor, ASIC or FPGA for example.

Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A singulation apparatus for an article carrying system, the apparatus comprising:
   a dry in-feed comprising at least one in-feed belt, said at least one in-feed belt being adapted to convey a plurality of articles;
   a flume having a first end and a second end, wherein the flume comprises a receiving portion that is located so as to receive the plurality of articles from an outlet of the in-feed at or proximate to the first end of the flume, and wherein the receiving portion of the flume is positioned lower than the outlet of the dry in-feed;
   a liquid inlet in liquid connection with the first end of the flume and adapted to provide and direct a liquid flow from the first end of the flume to the second end of the flume, carry the received articles along therewith; and
   a control device adapted to control a parameter of the liquid flow in order to singulate the received articles along the flume
   further comprising a pliable landing surface at the first end for receiving the articles prior to carriage along the flume.

2. An apparatus according to claim 1, wherein the parameter of the liquid flow is one or more of the following: liquid volume flow rate; liquid speed; liquid level, and the liquid is water.

3. An apparatus according to claim 1, wherein the landing surface comprises a surface of a pliable material arranged in use to be inflated by the liquid flow.

4. An apparatus according to claim 3, wherein the landing surface comprises a pliable material arranged between an orifice and a lower landing pad, the pliable material located adjacent the liquid inlet such that in use the pliable material is inflated by the liquid flow which is then directed into the flume via the orifice.

5. An apparatus according to claim 1, wherein the pliable surface is angled upwards from a longitudinal axis of the flume.

6. An apparatus according to claim 1, wherein a longitudinal axis of the flume is angled downwardly from the first end at between 2 to 3 degrees.

7. An apparatus according to claim 1, the flume having side walls and an included angle between the side walls is greater than 80 degrees.

8. An apparatus according to claim 1, further comprising a load belt for receiving articles from the second end of the flume, and wherein, in use, the liquid speed is substantially equal to the speed of the load belt.

9. An apparatus according to claim 1, further comprising a load belt for receiving articles from the second end of the flume, and wherein, in use, the liquid speed is faster than the speed of the load belt.

* * * * *